United States Patent
Hu

(10) Patent No.: US 6,315,529 B1
(45) Date of Patent: Nov. 13, 2001

(54) COOLING FAN WITH ANTI DEFLECTION ARRANGEMENT

(75) Inventor: Chin Yi Hu, Taipei (TW)

(73) Assignee: Tranyoung Technology Corp., Taipei (TW)

(*) Notice: Subject to any disclaimer, the term of this patent is extended or adjusted under 35 U.S.C. 154(b) by 0 days.

(21) Appl. No.: 09/565,405

(22) Filed: May 4, 2000

(51) Int. Cl.[7] .................................................. F04B 17/00
(52) U.S. Cl. ............................................................ 417/423.1
(58) Field of Search ........................ 417/423.1, 423.12, 417/423.7, 354

(56) References Cited

U.S. PATENT DOCUMENTS

| | | | | |
|---|---|---|---|---|
| 4,861,237 | * | 8/1989 | Shriraki et al. | 417/353 |
| 4,987,331 | * | 1/1991 | Horng | 310/254 |
| 5,099,181 | * | 3/1992 | Canon | 318/254 |
| 5,288,216 | * | 2/1994 | Bolte | 417/423.7 |
| 5,492,458 | * | 2/1996 | Horng | 417/423.7 |
| 5,947,704 | * | 9/1999 | Hsieh | 417/423.12 |
| 5,997,267 | * | 12/1999 | Lee | 417/423.7 |
| 6,109,892 | * | 8/2000 | Horng | 417/423.15 |
| 6,132,170 | * | 10/2000 | Horng | 415/178 |

* cited by examiner

Primary Examiner—Charles G. Freay
Assistant Examiner—William Rodriguez
(74) Attorney, Agent, or Firm—Pro-Techtor International Services

(57) ABSTRACT

A cooling fan comprises a rotor, a stator, a circuit board, a base, and a magnetic plate wherein rotor includes blades, a magnetic recess, and a shaft; stator has posts; circuit board has apertures corresponding to the posts; and base includes a bearing and a sleeve. Posts of stator are inserted into apertures of circuit board, shaft of rotor is inserted through stator and circuit board to secure in the bearing of base, and magnetic plate is located between stator and circuit board corresponding to and lower than magnetic recess of rotor by a gap, and is spaced apart from the poles of stator. By utilizing this, a cooling fan with anti deflection capability, enhanced performance, and prolonged life is effected.

7 Claims, 2 Drawing Sheets

COOLING FAN WITH ANTI DEFLECTION ARRANGEMENT

FIELD OF THE INVENTION

The present invention relates to a computer component and more particularly to a cooling fan with anti deflection arrangement.

BACKGROUND OF THE INVENTION

Conventionally, blades of rotor of cooling fan are thermoplastic substances formed by injection molding. It is often found that not all blades mounted on fan have the same weight due to the uncontrollable amount of variation in the manufacturing process. As such, shaft of fan may deflect to one side in high speed rotation which in turn cause a rough rotation of shaft and a uneven contact between shaft and bearing. This situation and others such as noise and overworn are even worse in cooling fan with a single ball bearing provided. This significantly shortens the useful life of cooling fan.

SUMMARY OF THE INVENTION

It is thus an object of the present invention to provide an improved cooling fan with a means for preventing shaft of rotor from deflecting so as to prolong the useful life thereof.

To achieve the above and other objects, the present invention provide a cooling fan comprising a rotor, a stator, a circuit board, a base, and a magnetic plate wherein rotor includes a plurality of blades, a magnetic recess, and a shaft; stator has a plurality of posts; circuit board has a plurality of apertures corresponding to the posts; and base includes a bearing and a sleeve. In assembly, posts of stator are inserted into apertures of circuit board, shaft of rotor is inserted through stator and circuit board to secure in the bearing of base, and magnetic plate is located between stator and circuit board wherein the annular edge of magnetic plate is corresponding to and lower than magnetic recess of rotor by a predetermined gap, and is spaced apart from the poles of stator.

The principles of the invention in operation is that magnetic recess of rotor is magnetically attracted by magnetic plate so as to generate an axial attractive force for restraining the radial deflection of rotor within an acceptable minimum such that the original radial deflection of shaft in rotation caused by uneven weights of blades are much eliminated and corrected, thereby reducing friction between shaft and bearing during rotation for achieving a smooth operation.

In a first aspect of the invention, magnetic plate is adhered to one side of circuit board.

In a second aspect of the invention, magnetic plate has a plurality of dents corresponding to apertures of circuit board for securing stator, magnetic plate, and circuit board together by inserting posts of the stator through dents of the magnetic plate into the apertures of the circuit board.

In a third aspect of the invention, the side of circuit board with magnetic plate adhered thereon is a smooth surface without any circuit devices provided thereon.

In a fourth aspect of the invention, magnetic plate is of annular shaped.

In a fifth aspect of the invention, magnetic plate is of strip shaped.

In a sixth aspect of the invention, magnetic plate is of block shaped.

The above and other objects, features and advantages of the present invention will become apparent from the following detailed description taken with the accompanying drawings.

DETAILED DESCRIPTION OF THE PREFERRED EMBODIMENTS

Figure 1:
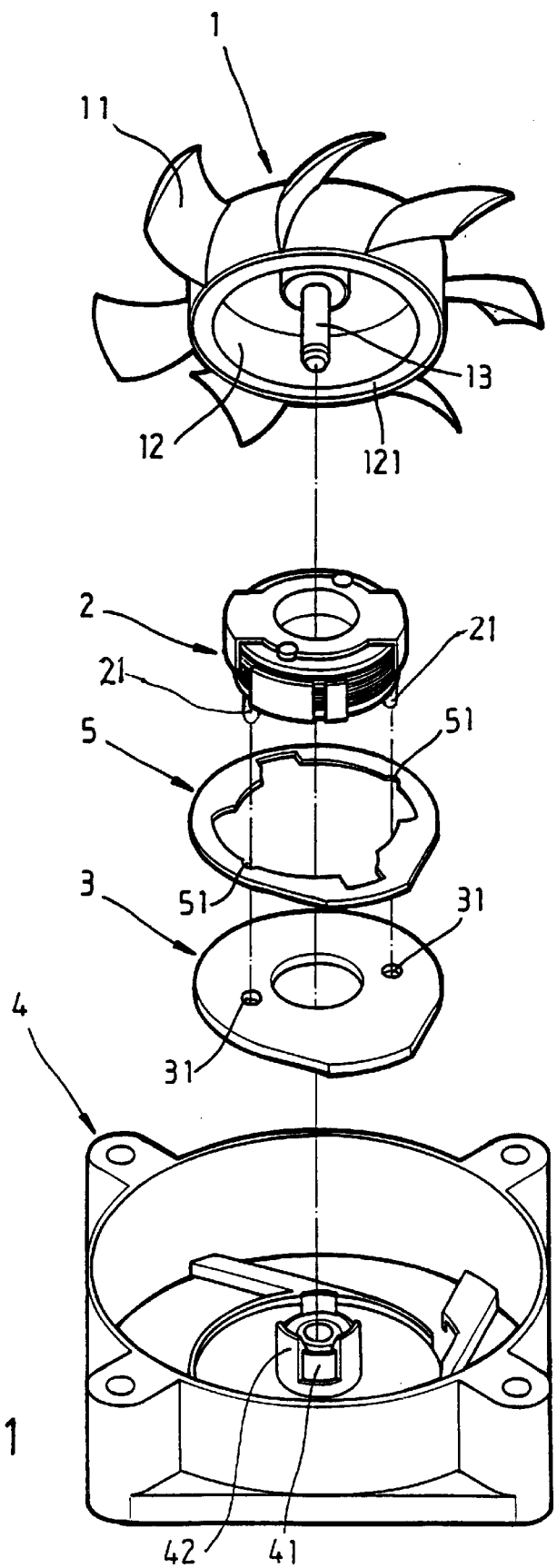
FIG. 1 is an exploded view of a preferred embodiment of cooling fan according to the invention.
Figure 3:
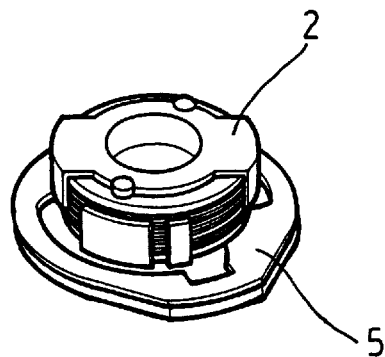
FIG. 3 is a sectional view of assembled cooling fan shown in FIG. 1.
Figure 2:
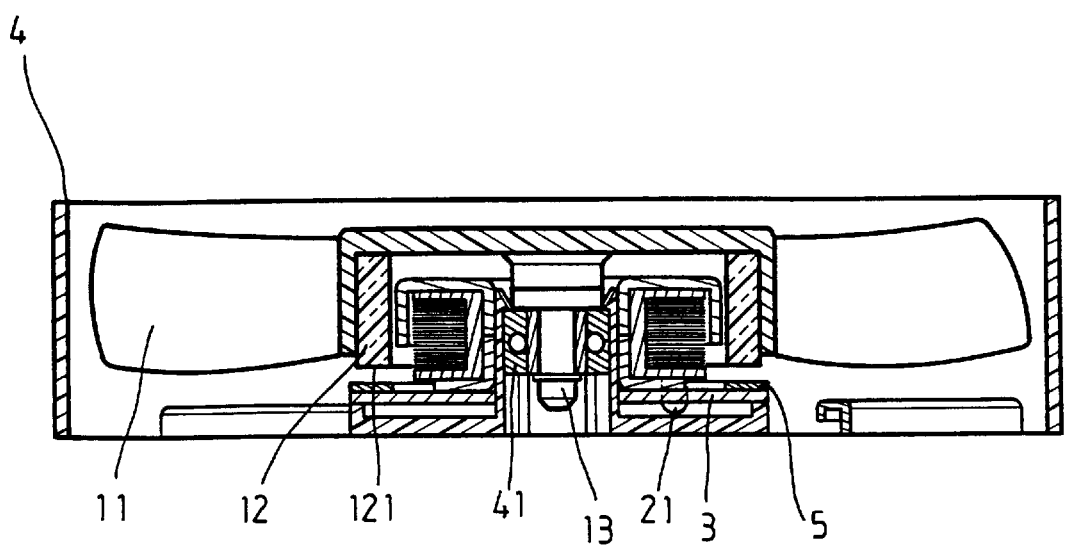
FIG. 2 is a perspective view of assembled stator and magnetic plate shown in FIG. 1.

Referring to FIGS. 1, 2, and 3, there is shown a cooling fan constructed in accordance with the invention comprising a rotor 1, a stator 2, a circuit board 3, a base 4, and a magnetic plate 5 wherein rotor 1 includes a plurality of blades 11, a magnetic recess 12, and a shaft 13; stator 2 has a plurality of posts 21; circuit board 3 has a plurality of apertures 31 corresponding to the posts 21; and base 4 includes a bearing (e.g., ball bearing) 41 and a sleeve 42. In assembly, posts 21 of stator 2 are inserted into apertures 31 of circuit board 3, and shaft 13 of rotor 1 is inserted through stator 2 and circuit board 3 to secure in the bearing 41 of base 4. Above components are conventional ones, while the novel features of the invention are detailed below.

Preferably, magnetic plate 5 is provided between stator 2 and circuit board 3. Annular edge of magnetic plate 5 is corresponding to and lower than magnetic recess 12 of rotor 1 by a predetermined gap, and is spaced apart from the poles of stator 2. Further, magnetic plate 5 has a plurality of dents (two are shown) 51 corresponding to apertures 31 of circuit board 3 for securing stator 2, magnetic plate 5, and circuit board 3 together by inserting posts 21 of the stator 2 through dents 51 of the magnetic plate 5 into the apertures 31 of the circuit board 3.

It is designed that top side of circuit board 3 is a smooth surface without any circuit devices provided thereon. As such, the components between the top side of circuit board 3 and rotor 1 are affected by the magnetic force of magnetic recess 12, thereby generating an axial force for restraining the radial deflection of rotor 1.

Moreover, magnetic plate 5 is adhered to the top side of circuit board 3. Thus an axial attractive force is generated in the gap between the annular bottom edge 121 of magnetic recess 12 of rotor 1 and magnetic plate 5 when shaft 13 of rotor 1 inserts in the bearing 41 of base 4. This axial attractive force can restrain the radial deflection of rotor 1 within an acceptable minimum such that the original radial deflection of shaft 13 in rotation caused by uneven weights of blades 11 are much eliminated and corrected.

Preferably, magnetic plate 5 is of annular shaped, strip shaped, or block shaped as long as magnetic plate 5 does not contact the poles of stator 2 for causing short circuit to adversely affect the magnetic loop between stator 2 and rotor 1.

While the invention herein disclosed has been described by means of specific embodiments, numerous modifications and variations could be made thereto by those skilled in the art without departing from the scope and spirit of the invention set forth in the claims.

What is claimed is:

1. A cooling fan particularly for a computer comprising:
    a rotor including a plurality of blades, a magnetic recess, and a shaft;
    a stator having a plurality of posts;
    a circuit board having a plurality of apertures corresponding to the posts;

a base including a bearing and a sleeve; and a magnetic plate;

wherein the posts of the stator are inserted into the apertures of the circuit board, the shaft of the rotor is inserted through the stator and the circuit board to secure in the bearing of the base, and the magnetic plate is located between the stator and the circuit board corresponding to and lower than the magnetic recess of the rotor by a predetermined gap.

2. The cooling fan of claim 1, wherein the magnetic plate is adhered to one side of the circuit board.

3. The cooling fan of claim 1, wherein the magnetic plate includes a plurality of dents corresponding to the apertures of the circuit board for securing stator, magnetic plate, and circuit board together by inserting the posts of the stator through the dents of the magnetic plate into the apertures of the circuit board.

4. The cooling fan of claim 1, wherein one side of the circuit board with the magnetic plate adhered thereon is a smooth surface without any circuit devices provided thereon.

5. The cooling fan of claim 1, wherein the magnetic plate is of annular shaped.

6. The cooling fan of claim 1, wherein the magnetic plate is of strip shaped.

7. The cooling fan of claim 1, wherein the magnetic plate is of block shaped.

* * * * *